April 5, 1927.
O. W. FISHER
LUBRICANT PUMP
Filed March 17, 1926
1,623,101
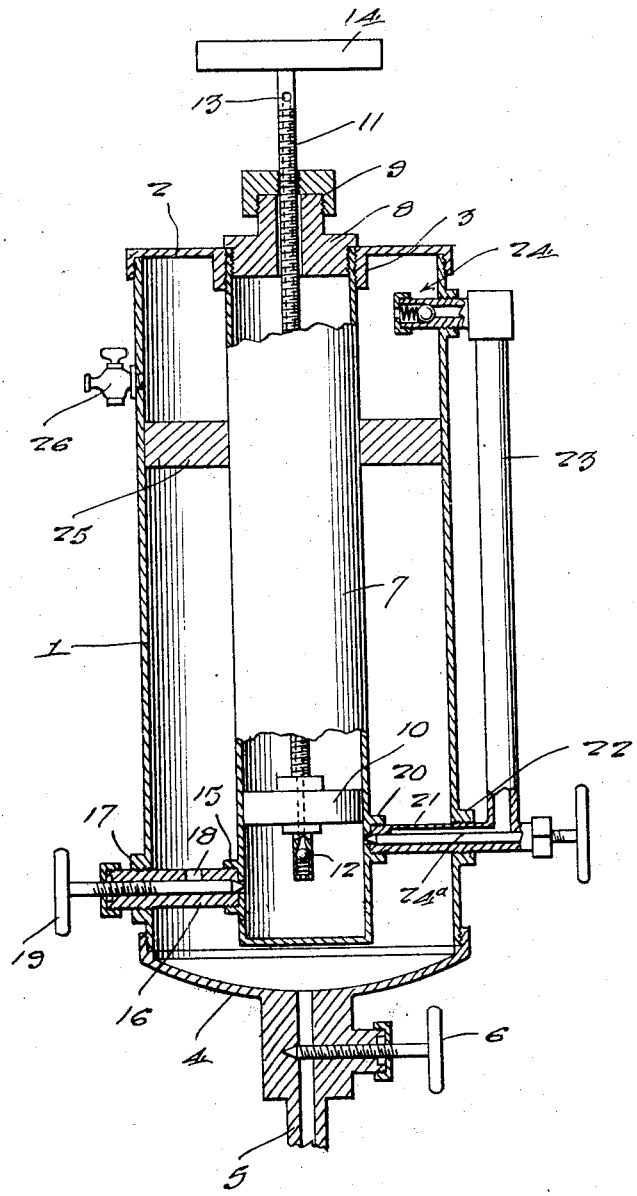
Inventor
O. W. Fisher
By Clarence A O'Brien
Attorney Patented Apr. 5, 1927.

1,623,101

UNITED STATES PATENT OFFICE.

OLIVER WENDELL FISHER, OF BATON ROUGE, LOUISIANA.

LUBRICANT PUMP.

Application filed March 17, 1926. Serial No. 95,322.

This invention relates to an improved lubricating device capable of general use for supplying lubricating grease and the like to a suitable source of supply, and adapted particularly for supplying a lubricant to the bearings of various kinds of machinery used in turbine pump houses, and the like.

Briefly, the invention comprises a lubricant receiving and containing casing, an air pressure operated follower therein, a lubricant feeding and air supply pump, and appropriate valved passages.

One feature of construction is the pump which has a double function; first, as a means of receiving and forcing the grease into the main outer casing, and secondly as a means of supplying a current of air to actuate the follower in the casing.

A second feature of construction is the stuffing box which constitutes a closure for the outer open end of the pump cylinder, this box being so constructed that it permits a positive screw threaded feeding action of the plunger while ejecting the lubricant from the cylinder, and a reciprocatory action of the plunger stem when the device is used as an air supply pump.

Other features of construction will become apparent from the following description and drawing.

In the accompanying drawing forming a part of this application, and in which like numerals are employed to designate like parts throughout the same:

The figure represents a view in section and elevation showing the complete device and parts and relative arrangement thereof.

Referring to the drawings in detail, the reference character 1 designates a casing which is in the form of an open ended tube. The upper end of this tube is closed by a screw cap 2 having a central opening surrounded by an internally screw threaded collar 3. A suitable closure 4 is also provided for the opposite end of the tube and this is equipped with a discharge 5 having appropriate valves 6 associated therewith.

Screwed into the collar 3 is a cylinder 7 which has its bottom extending in close proximity to the closure 4. This cylinder is internally screw threaded at its open end and a plug 8 is fitted into the screw threaded end. The plug has a reduced neck on which a cap nut 9 is fitted. Slidable in the cylinder is a plunger disc 10 fitted on a screw threaded plunger stem 11. It should be noted that this plunger stem is of hollow form and is provided at its inner end with a ball check valve 12 and at its outer end with an air intake port 13. In addition, it is formed with a cross piece 14 providing a handle. It will be noted that the nut 9 is screw threaded so that the stem is threaded therethrough to obtain a positive fee of the plunger disc 10. It will also be noted that the central bore of the plug 8 is of a greater diameter than that of the stem and the stem is therefore allowed to move freely through this bore.

Directing attention to the inner end of the cylinder it is seen that it is formed on one side with a nipple 15 in which a fitting 16 is tapped. The aforesaid casing 1 is also provided at this point with a nipple 17 in which the outer end of this fitting is threaded. The fitting is provided with an appropriate stuffing box and with an oil discharge opening 18. A valve 19 is associated therewith for closing the opening 18 and also closing the inner end which ordinarily has communication with the interior of the cylinder 7. At its substantially diametrical opposite point is another nipple 20 in which the inner end of the branch 21 of an L-shaped member is fitted. The outer end of this branch extends through another nipple 22 on the casing and connects with the relatively long branch 23 of said member. This branch extends near the top of the casing and is disposed in spaced parallelism to the casing. A needle valve 24ª is associated with the branch 21. This branch 21 together with the branch 23 and the valved discharge member 24 form a conduit for passage of air under pressure. At this time I would direct attention to the fact that a follower disc 25 is located in the casing at a point below the discharge device 24. In addition, a pet cock 26 is connected to the casing at a point above the follower.

The device is used in the following way.—The stuffing box comprising the plug 8 and the nut 9 is removed. Then the plunger comprising the disc 10 and the stem 11 is removed, the lubricating medium is now placed in the cylinder 7 and the stuffing box and plunger replaced. Then the plunger is rotated until the disc 10 is screwed down adjacent the bottom of the cylinder 7 to eject the lubricant into and through the fitting 16. At this time the valve 19 is open to an extent sufficient to uncover the port 18.

At the same time the needle valve 24ᵃ is closed. In this way all of the lubricant from the cylinder is forced into the casing 1. Owing to the different proportions of the cylinder and casing it is necessary to refill the cylinder several times to provide the desired amount of lubricant for the larger casing. Of course, at this time the valve 6 in the discharge passage 5 is closed. As the lubricant is ejected into the casing the follower disc is moved upwardly. After the desired quantity of grease or other lubricant is placed in the casing, the nut 9 is unscrewed. The stem 11 and disc 10 may now be used as a pump plunger and as the plunger is reciprocated air is sucked into the hole 13 and forced out through the valved inner end of the plunger. At this time the valve 24ᵃ is opened to permit the air from the pump to travel through the branches 21, 23, and the valved discharge device 24. The air under pressure thus enters the casing above the follower disc 5, and when sufficient pressure is built up in this chamber the disc is forced down against the grease in the casing. Assuming that the discharge passage is open at this time, the follower will automatically and continuously force the lubricant from the casing through the discharge as long as sufficient pressure is maintained through the use and operation of the hand pump.

As the construction and operation will be clear by considering the description in connection with the drawings a more lengthy description is thought unnecessary.

Minor changes coming within the field of invention claimed may be resorted to if desired.

Having thus described the invention, what I claim as new and desire to secure by Letters Patent is:—

1. In a device of the class described, a casing having a valve discharge at one end, an air pump carried by and extending into the interior of the casing, said pump including a cylinder fixedly connected to said casing and a plunger slidable in the cylinder, a follower slidably mounted in said casing and upon said cylinder, and a valved air passage connected with the inner end portion of the cylinder and communicating with the upper portion of the casing on one side of said follower.

2. In a device of the class described, a casing having a valved discharge at one end, a cylinder fixedly mounted upon the opposite end and extending into the interior of the casing, a valved connection between the casing and cylinder affording communication therebetween, a follower slidably mounted in said casing and upon said cylinder, a valved air conduit connected with the inner end portion of said cylinder and an opposite end portion of said casing at a point above said follower, a removable closure associated with the outer end of said cylinder, and a plunger cooperative with the closure and cylinder.

In testimony whereof I affix my signature.

OLIVER WENDELL FISHER.